No. 735,777. Patented August 11, 1903.

UNITED STATES PATENT OFFICE.

SATORI KATO, OF CHICAGO, ILLINOIS, ASSIGNOR TO KATO COFFEE COMPANY, OF CHICAGO, ILLINOIS, A CORPORATION OF ILLINOIS.

COFFEE CONCENTRATE AND PROCESS OF MAKING SAME.

SPECIFICATION forming part of Letters Patent No. 735,777, dated August 11, 1903.

Application filed April 17, 1901. Serial No. 56,214. (Specimens.)

*To all whom it may concern:*

Be it known that I, SATORI KATO, a subject of the Emperor of Japan, residing at Chicago, in the county of Cook and State of Illinois, have invented certain new and useful Improvements in Coffee Concentrate and Process of Making Same, of which the following is a specification.

This invention relates more particularly to the production in a hard dry state of a coffee concentrate which is not liable to become rancid and which does not owe its resistance to rancidity nor its dry hard state to the presence therein of foreign matter or fiber, but which may consist entirely of the aromatic and healthful constituents of the coffee-bean.

In accordance with the invention the volatile oil of the coffee is mixed with the solid aqueous extract, but I have discovered that an attempt to effect this without other precaution results in the production of a pasty sticky mass which does not resist rancidity, but quickly spoils under the usual conditions of transportation and storage. I have further discovered that the difficulty arises from the presence in the concentrate of the non-volatile coffee-fat or at any rate is overcome by its removal, which, I believe, I am the first to effect.

In the practice of my invention I separate the volatile oil and the fats from the coffee and remove the fiber and reduce the residue to a hard substance. This hard substance is reduced to a finely-divided condition and a portion thereof is pulverized and thoroughly mixed with the pure volatile oil and dried, after which this mixture is mixed with the remainder of the hard substance and used in this granulated or flaky form or pressed into tablets.

The specific process employed may be described as follows: I first roast and reduce the coffee to a finely-divided condition by grinding or pulverizing and then subject it to heavy pressure to remove the fats, after which the volatile oil is separated from the coffee by distillation. The residue remaining after the removal of the volatile oil is diluted with hot water and allowed to cool, after which it is thoroughly agitated to cause whatever fats remain therein to collect at the top, so that they can be readily skimmed off. The residue is then filtered to remove the fiber, after which the residue consists, essentially, of caffetannic acid, the nutrient substances, coloring-matter, and caffein. This residue is then boiled and thoroughly stirred or agitated during the boiling operation until all moisture has been evaporated and the mass is reduced to a hard substance. This hard substance is then granulated in a suitable manner, and a portion thereof—say one-fourth of the quantity—is pulverized and mixed with the volatile oil. This mixture is spread on a hard, dry, smooth surface, such as glass or porcelain, and dried in a temperature above freezing-point, and preferably below 40° Fahrenheit to retain the aroma, the drying being readily accomplished by circulating air-currents over the mixture. The dry mixture of pulverized hard substance and volatile oil is then removed from the drying surface and mixed with the remainder of the granulated hard substance, and the coffee concentrate is then obtained in a commercial form which will retain its aroma and all the other desirable properties of the coffee-beans and can be used in this finely-divided condition or pressed into tablets or other form. The coffee concentrate thus obtained embodies all of the pleasant and desirable properties of coffee-beans in a perfectly-pure and unadulterated state and entirely free from the unpleasant and insoluble constituents, and this concentrate will preserve its aroma indefinitely.

By following the process herein described it will be observed that I obtain the volatile oil of the coffee-beans in a perfectly-pure state and entirely free from fats and also remove the fiber, leaving a residue which is reduced to a hard substance by evaporation. The pure volatile oil is then mixed with a comparatively small portion of this hard substance in order that it may become thoroughly absorbed thereby, and when this is dried and mixed with the remainder of the hard substance the entire quantity of the hard substance becomes thoroughly impregnated with the volatile oil, and the product consists of the soluble constituents of coffee-beans in a dry, hard, commercial state, free of adulterants or admixtures. After the pulverized portion of the hard substance is mixed with the volatile oil and dried upon the drying-surface it becomes brittle and can be removed from said surface by scraping or in any suitable manner and will come off in a pulverulent, flaky, or finely-divided condition.

My novel coffee concentrate is produced in a convenient form for use, and it retains its strong aromatic properties under all normal conditions. By reason of the fact that I combine all of the aromatic and desirable properties of the coffee in my concentrate and remove the fats and fibrous matter I thereby largely increase the quantity of drinking-coffee obtainable from a given quantity of coffee-beans.

Having thus fully described my invention, what I claim as new, and desire to secure by Letters Patent, is—

1. A dry and hard rancidity-resisting coffee concentrate composed of a fat-freed aqueous extract and volatile oil of coffee, substantially as described.

2. The herein-described process of producing coffee concentrate, which consists in separating the volatile oil, fats and fibrous matter from the roasted coffee and reducing the residue to a dry, hard state; granulating said hard residue and pulverizing a portion thereof; mixing said pulverized portion of the hard residue and the volatile oil and drying same in a low temperature; and then mixing the dried mixture of pulverized, hard substance and volatile oil with the remainder of the granulated, hard substance.

3. The herein-described process of producing coffee concentrate, which consists in roasting and reducing coffee-beans to a finely-divided condition and removing the fats; separating the volatile oil from the coffee by distillation; separating the fiber from the coffee, after the volatile oil and fats have been removed, and reducing the residue to a hard, solid substance by evaporation, and granulating the same; pulverizing a portion of this granulated, hard substance and mixing this pulverized portion with the volatile oil; drying said mixture on a smooth, hard surface in a low temperature; removing the mixture from the drying-surface and mixing it with the remainder of the granulated, hard substance.

4. The herein-described process of producing coffee concentrate, which consists in roasting and reducing coffee-beans to a finely-divided condition, and subjecting them to heavy pressure to remove the fats; then separating the volatile oil, and the fiber from the coffee and reducing the residue to a dry, hard state; granulating the hard residue and pulverizing a portion thereof and mixing said pulverized portion with the volatile oil; drying said mixture on a smooth, hard surface in a low temperature above freezing; and then mixing said dried mixture of pulverized residue and volatile oil with the remaining granulated residue.

5. A dry and hard fiberless rancidity-resisting coffee tablet composed of a compressed mass of a fat-freed aqueous extract and volatile oil of coffee, substantially as described.

6. The process of producing coffee concentrate, by separating from the coffee a fat-freed aqueous extract and a volatile oil, evaporating the extract, mixing the solid extract and the oil, and drying the mixture, substantially as described.

7. The process of producing tablets of coffee concentrate, by separating from the coffee a fat-freed aqueous extract and a volatile oil, filtering the extract, evaporating the filtered extract, mixing the solid extract and the oil, drying the mixture, and compressing the dried product into tablets, substantially as described.

8. A dry and hard rancidity-resisting coffee concentrate containing a fat-freed aqueous extract of coffee, substantially as described.

SATORI KATO.

Witnesses:
WM. O. BELT,
KATHRYN MCLAREN.